(12) United States Patent
Yamaguchi et al.

(10) Patent No.: US 6,941,041 B2
(45) Date of Patent: Sep. 6, 2005

(54) GRADIENT INDEX ROD LENS UNIT AND MICROCHEMICAL SYSTEM HAVING THE SAME

(75) Inventors: Jun Yamaguchi, Tokyo (JP); Akihiko Hattori, Osaka (JP); Takehiko Kitamori, Tokyo (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/754,761

(22) Filed: Jan. 9, 2004

(65) Prior Publication Data

US 2004/0233542 A1 Nov. 25, 2004

Related U.S. Application Data

(63) Continuation of application No. PCT/JP02/06843, filed on Jul. 5, 2002.

(30) Foreign Application Priority Data

Jul. 10, 2001 (JP) .......................... 2001-209090

(51) Int. Cl.[7] .............................. G02B 6/32; G02B 6/00
(52) U.S. Cl. ........................................ 385/34; 385/12
(58) Field of Search ..................................... 385/12, 34

(56) References Cited

U.S. PATENT DOCUMENTS

| 4,495,299 | A | * | 1/1985 | Noguchi et al. | ............... 501/72 |
| 5,459,605 | A | * | 10/1995 | Kempf | ......................... 359/462 |
| 6,219,477 | B1 | * | 4/2001 | Peck, Jr. | ....................... 385/34 |
| 6,317,270 | B2 | * | 11/2001 | Nagaoka | ...................... 359/684 |
| 2001/0003724 | A1 | | 6/2001 | Yamaguchi | |
| 2002/0031301 | A1 | * | 3/2002 | Sasaki et al. | .................. 385/34 |

FOREIGN PATENT DOCUMENTS

| JP | 63-124011 A | 5/1988 |
| JP | 6-171974 A | 6/1994 |
| JP | 08-178897 A | 7/1996 |
| JP | 2001-59829 A | 3/2001 |
| WO | WO 02/40981 A1 | 5/2002 |

* cited by examiner

Primary Examiner—John D. Lee
Assistant Examiner—James D. Stein
(74) Attorney, Agent, or Firm—Frishauf, Holtz, Goodman, Chick, P.C.

(57) ABSTRACT

There is provided a gradient index rod lens unit having a desired chromatic aberration. The gradient index rod lens unit is comprised of two gradient index rod lenses 11 and 12 with different chromatic aberrations and the entire lengths thereof adjusted, which are disposed in series with the optical axes thereof in alignment. The chromatic aberration of the gradient index rod lens unit can be set to a value falling within chromatic aberration ranges inherently possessed by the respective gradient index rod lenses 11 and 12.

12 Claims, 6 Drawing Sheets

FOCAL LENGTH = 2.062   NA = 0.2266

FOCAL LENGTH = -56.78  NA = 0.2338

GRADIENT INDEX ROD LENS UNIT AND MICROCHEMICAL SYSTEM HAVING THE SAME

This application is a Continuation Application of International Application PCT/JP02/06843 filed Jul. 5, 2002, which claims the benefit of priority of JP 2001-209090 filed Jul. 10, 2001.

TECHNICAL FIELD

The present invention relates to a gradient index rod lens unit comprised of a plurality of gradient index rod lenses, and a microchemical system having the lens unit.

BACKGROUND ART

Conventionally, gradient index rod lenses are used in collimators for communication applications, optical coupling elements used in optical fibers, endoscope objective lenses for medical applications, objective lenses used in optical disk systems such as CD players and DVD players.

Such a gradient index rod lens is made of a cylindrical transparent element which has a refractive index continuously varying from the center to the periphery thereof and which is known as a converging light-transmitting body for which the refractive index $n(r)$ at a position a distance $r$ from the central axis in the radial direction is given approximately by the quadratic equation in r, $$n(r)=n_0\{1-(g^2/2) \cdot r^2\},$$

wherein $n_0$ represents the refractive index at the central axis, and g represents the square distribution constant.

If the length $z_0$ of the rod lens is chosen to be in a range of $0<z_0<\pi/2g$, then the image formation characteristics of the rod lens will be the same as those of a normal convex lens, even though the both end faces of the rod lens are flat; when a parallel light beam is incident on one end face of the rod lens, a focal point will be formed at a position a distance $s_0$ from the other end face of the rod lens (the end face from which the light beam exits), where $$s_0=\cot(gz_0)/n_0 g.$$

The gradient index rod lens having such characteristics can be used in the form of a cylinder, and therefore can be easily incorporated in various kinds of apparatuses. Further, the both end faces of the gradient index rod lens are flat surfaces orthogonal to the optical axis of the rod lens, and optical axis alignment can be easily carried out for optical systems.

Such a gradient index rod lens can be manufactured by the following method, for example:

A rod-shaped element is formed from a glass having 57 to 63 mol % of $SiO_2$, 17 to 23 mol % of $B_2O_3$, 5 to 17 mol % of $Na_2O$, and 3 to 15 mol % of $Tl_2O$ as principal components. This glass rod element is then treated in an ion exchange medium such as a potassium nitrate salt bath, thus carrying out ion exchange between thallium ions and sodium ions in the glass and potassium ions in the medium, and hence giving the glass rod element a refractive index distribution in which the refractive index decreases continuously from the center of the glass rod element toward the periphery thereof. According to this manufacturing method, even a gradient index rod lens with a diameter of not more than 1 mm can be easily manufactured at low costs. Further, a gradient index rod lens having the same characteristics may be manufactured even from a transparent plastic instead of glass.

Suitable applications of the gradient index rod lens include microchemical systems as one of integration technologies for carrying out chemical reactions. Such a microchemical system is intended to have capability of carrying out all functions of mixing, reaction, separation, extraction, detection or the like on a sample placed in a very narrow channel which is formed in a small glass substrate or the like. A microchemical system having a single function such as separation, or a microchemical system having a plurality of functions may be used. Examples of reactions carried out in the microchemical system include diazotization reactions, nitration reactions, and antigen-antibody reactions. Examples of extraction/separation include solvent extraction, electrophoretic separation, and column separation.

As an example in which 'separation' is the sole aim, an electrophoresis apparatus for analyzing extremely small amounts of proteins, nucleic acids or the like has been proposed by Japanese Laid-open Patent Publication (Kokai) No. 8-178897. This electrophoresis apparatus analyzes extremely small amounts of proteins, nucleic acids or the like and is provided with a channel-formed plate-shaped element comprised of two glass substrates joined together. Because the element is plate-shaped, breakage is less likely to occur than in the case of a glass capillary tube having a circular or rectangular cross section, and hence handling is easier.

In the microchemical system, because the amount of the sample is very small, a high-precision detection method is essential. As such a high-precision detection method, a photothermal conversion spectroscopic analysis method has been established, which utilizes a thermal lens effect that is produced through a liquid-borne sample absorbing light in a very narrow channel. The path to making a detection method of the required precision fit for practical use has been opened up through the establishment of the above analysis method.

The photothermal conversion spectroscopic analysis method utilizes a photothermal conversion effect that when light is convergently irradiated onto a sample, the temperature of a solvent is locally increased by thermal energy emitted due to light absorbed by a solute in the sample to cause a change in the refractive index and hence generate a thermal lens.

FIG. 5 is a view useful in explaining the principle of a thermal lens.

In FIG. 5, a convergent beam of exciting light is irradiated onto an extremely small sample via an objective lens of a microscope, whereupon a photothermal conversion effect takes place. For most substances, the refractive index drops as the temperature rises, and hence the drop rate of the refractive index of the sample is greater toward the center of the convergent beam of exciting light, which is where the temperature rise is highest. Due to thermal diffusion, the temperature rise becomes smaller and hence the drop in refractive index becomes smaller, with increasing distance from the center of the convergent beam of exciting light, i.e. decreasing distance to the periphery of the same. Optically, this pattern of change in the refractive index brings about the same effect as with a concave lens, and hence the effect is called the thermal lens effect. The size of the thermal lens effect, i.e. the power of the thermal lens is proportional to the optical absorbance of the sample. Moreover, in the case that the refractive index increases with temperature, a converse effect to the above, i.e. the same effect as a convex lens is produced.

In most cases where the photothermal conversion spectroscopic analysis method using the thermal lens described above is carried out, it is required that the focal position of the exciting light and that of the detecting light should be different from each other. FIGS. 6A and 6B are views useful in explaining the formation position of the thermal lens and the focal position of the detecting light in the direction of travel of the exciting light. FIG. 6A shows a case in which the objective lens has chromatic aberration, whereas FIG. 6B shows a case in which the objective lens does not have chromatic aberration.

In measurement according to the photothermal conversion spectroscopic analysis method using the thermal lens, in the case that the objective lens 130 has chromatic aberration, a thermal lens 131 is formed at the focal position 132 of the exciting light as shown in FIG. 6A. The focal position 133 of the detecting light is shifted by an amount ΔL from the focal position 132 of the exciting light, and thus changes in the refractive index within the thermal lens 131 can be detected as changes in the focal distance of the detecting light from the detecting light. In the case that the objective lens 130 does not have chromatic aberration, on the other hand, the focal position 133 of the detecting light is almost exactly the same as the focal position 132 of the exciting light, i.e. the position of the thermal lens 131 as shown in FIG. 6B. The detecting light is thus not deflected by the thermal lens 131, and hence changes in the refractive index within the thermal lens 131 cannot be detected.

There is the optimal value for the difference between the focal position of the exciting light and the focal position of the detecting light. This optimal value is determined by the wavelengths of the exciting light and the detecting light, the intensity of the exciting light and the detecting light, the concentration of the sample, the thickness of the sample, etc. The different ΔL between the focal position of the exciting light and the focal position of the detecting light is desirably Ic<ΔL<30·Ic.

The confocal length Ic (nm) is given by $Ic=\pi \cdot (d/2)^2/\lambda_1$, wherein d represents the diameter of the Airy disk and is given by $d=1.22 \times \lambda_1/NA$, $\lambda_1$ represents the wavelength (nm) of the exciting light, and NA represents the numerical aperture of the lens.

The optimal value of the difference ΔL described above varies according to the thickness of the sample to be analyzed. When carrying out measurements on a sample having a thickness lower than the confocal length, it is more preferable for ΔL to be equal to Ic<ΔL<20·Ic, and it is most preferable for ΔL to be equal to √3·Ic. Therefore, it is desirable that the objective lens should have such a chromatic aberration that the ΔL value is close to the optimal value.

However, there is a limitation on the type of ions (glass components) that can be used to prepare a gradient index rod lens as described above. For example, thallium, lithium, cesium, and silver are frequently used so that a desired value of chromatic aberration cannot be always obtained. The chromatic aberration of the gradient index rod lens largely depends upon the type of ions used, though it also depends upon the type of mother glass used. A lens having a predetermined range of chromatic aberration can be manufactured using each type of ion, but there can be a range of chromatic aberration between predetermined ranges of chromatic aberration, that cannot be obtained.

Therefore, in the case where measurements are carried out according to the photothermal conversion spectroscopic analysis method in a microchemical system as described above, there is a fear that the chromatic aberration of the gradient index rod lens can assume an unsuitable value depending upon the conditions, and hence measurements cannot be properly carried out.

It is a first object of the present invention to provide a gradient index rod lens unit having a desired chromatic aberration, and further provide a gradient index rod lens unit which can permit varying only the aperture number of the focal position without varying the chromatic aberration and the distance between an end face of the lens and the focal position thereof.

It is a second object of the present invention to provide a microchemical system which is provided with a gradient index rod lens unit having a desired chromatic aberration.

DISCLOSURE OF INVENTION

To attain the first object, in a first aspect of the present invention, there is provided a gradient index rod lens unit comprising a plurality of cylindrical gradient index rod lenses each having a refractive index varying from an optical axis thereof toward a periphery thereof and arranged in series, characterized in that at least one of the plurality of gradient index rod lenses is different in chromatic aberration from the other gradient index rod lenses.

In the first aspect of the present invention, it is preferable that the at least one of the plurality of gradient index rod lenses is different in diameter from the other gradient index rod lenses.

In the first aspect of the present invention, it is preferable that one of the at least one of the plurality of gradient index rod lenses and the other gradient index rod lenses contains thallium such that the thallium varies in concentration from the optical axis thereof toward the periphery thereof, and the other contains lithium such that the lithium varies in concentration from the optical axis thereof toward the periphery thereof.

In a second aspect of the present invention, there is provided a microchemical system comprising a converging lens that converges exciting light and detecting light onto a sample, and a measuring device that measures the intensity of the detecting light passing through a thermal lens generated in the sample, characterized in that the converging lens comprises the gradient index rod lens unit according to the first aspect of the present invention.

In the second aspect of the present invention, it is preferable that the exciting light is different in focal position from the detecting light, and the interval between the focal position of the exciting light and the focal position of the detecting light is greater than the confocal length of the gradient index rod lens unit and less than a value 30 times as large as the confocal length.

In the second aspect of the present invention, it is preferable that the microchemical system comprises an optical fiber that guides the exciting light and the detecting light to the gradient index rod lens unit.

In the second aspect of the present invention, it is preferable that the gradient index rod lens unit is mounted on a tip of the optical fiber.

In the second aspect of the present invention, it is preferable that the optical fiber exhibits a single mode in the frequencies of the exciting light and the detecting light.

BEST MODE OF CARRYING OUT THE INVENTION

Embodiments of a gradient index rod lens unit and a microchemical system with the gradient index rod lens unit according to the present invention will now be described in detail with reference to the drawings.

Figure 1:
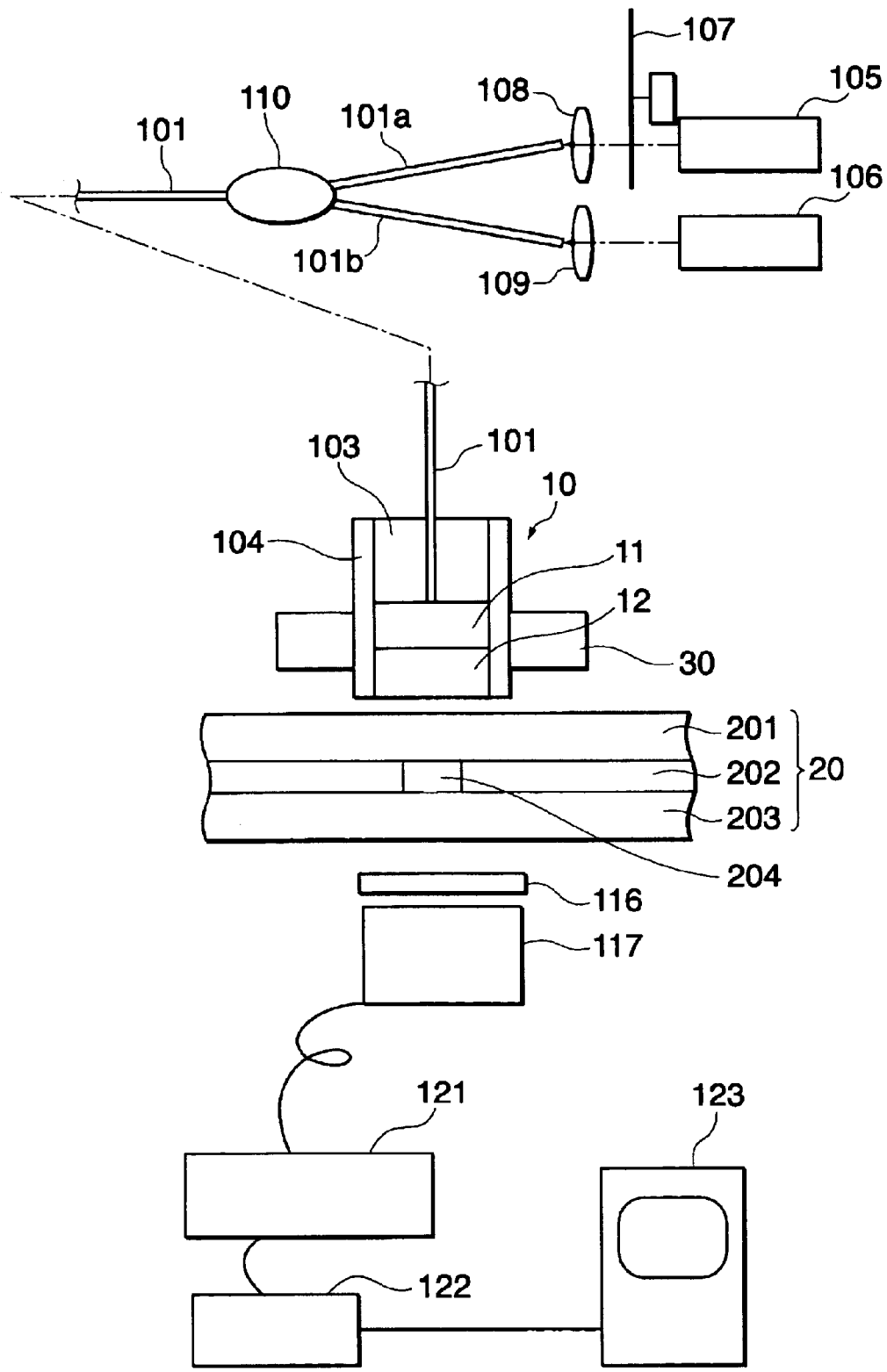
FIG. 1 is a schematic view showing the constitution of a microchemical system with a gradient index rod lens unit according to a first embodiment of the present invention.

FIG. 1 is a schematic view showing the constitution of a microchemical system with a gradient index rod lens unit according to a first embodiment of the present invention.

In FIG. 1, the gradient index rod lens unit 10 is comprised of two gradient index rod lenses 11 and 12 which have respective different chromatic aberrations. The gradient index rod lens 11 has a smaller chromatic aberration, and the gradient index rod lens 12 has a larger chromatic aberration. The gradient index rod lens 12 is different in the type of ions (glass component) from the gradient index rod lens 11 and thus has the larger chromatic aberration. The gradient index rod lenses 11 and 12 have end faces thereof bonded together by an organic adhesive agent or the like.

The gradient index rod lens unit 10 is mounted on a tip of an optical fiber 101 that transmits exciting light and detecting light in the single mode. The tip of the optical fiber 101 is mounted in a ferrule 103 that makes the outer diameter of the optical fiber 101 equal to the outer diameters of the gradient index rod lenses 11, 12. The gradient index rod lenses 11, 12, optical fiber 101, and ferrule 103 are rigidly joined together by a sleeve 104. The optical fiber 101 and the gradient index rod lenses 11, 12 may be held in tight contact with each other or in spaced relation to each other.

Disposed at the other end of the optical fiber 101 are an exciting light source 105 and a detecting light source 106. At a location downstream of the exciting light source 105 in the direction of travel of the exciting light is disposed a chopper 107 that modulates the exciting light. At a location downstream of the chopper 107 is disposed a light inputting lens 108 that introduces the exciting light into an optical fiber 101a while throttling the same. At a location downstream of the detecting light source 106 in the direction of travel of the detecting light is disposed a light inputting lens 109 that introduces the detecting light into an optical fiber 101b while throttling the same.

The optical fibers 101a, 101b are connected to an optical multiplexer 110. The optical multiplexer 110 aligns the exciting light from the optical fiber 101a and the detecting light from the optical fiber 101b and outputs the aligned light to the optical fiber 101. In the present embodiment, the exciting light and the detecting light are thus aligned with each other by the optical multiplexer 110 after they are introduced into the optical fibers 101a and 101b. Alternatively, the exciting light and the detecting light may be coaxially aligned with each other outside the optical fiber by means of a dichroic mirror or the like instead of using the optical multiplexer 110. Further, instead of modulating the exciting light using the chopper 107, the output from the exciting light source 105 per se may be modulated using a modulator or the like.

A plate-shaped element 20 in which a sample to be detected is made to flow is comprised of glass substrates 201, 202 and 203 which are stacked upon one another in three layers. The glass substrate 202 is formed therein with a channel 204 for mixing, agitating, synthesizing, separating, extracting or detecting a sample.

The plate-shaped element 20 is preferably made of glass in terms of durability and chemical resistance. In the case that living body samples such as cell samples are used for example for DNA analysis, the material of the glass substrates 201 to 203 is preferably a glass that has excellent acid resistance and alkali resistance, for example a borosilicate glass, a soda lime glass, an aluminoborosilicate glass, a quartz glass or the like. However, the plate-shaped element 20 may be made of an organic material such as a plastic for some specific usage.

The gradient index rod lens unit 10 is fixed in place such that an end face of the gradient index rod lens 12 is opposed to the channel 204 of the channel-formed plate-shaped element 20, by means of a jig 30. A wavelength filter 116 that separates the exciting light and the detecting light passing through the channel 204 from each other and selectively passes only the detecting light and a photoelectric transducer 117 that detects the detecting light passing through the wavelength filter 116 are disposed in opposed relation to the gradient index rod lens unit 10 with the plate-shaped element 20 therebetween. A pin hole for selectively passing only part of the detecting light may be provided at a location upstream of the photoelectric transducer 117 in the optical path for the detecting light. The photoelectric transducer 117 outputs a detection signal corresponding to the detected detecting light. The detection signal is amplified by a preamplifier 121, then fed to a lock-in amplifier 122, whereupon it is synchronized with the operation of the chopper 107 to be analyzed by a computer 123.

The focal position of the exciting light passing through the gradient index rod lens unit 10 of the microchemical system constructed as above is required to be located in the channel 204 of the channel-formed plate-shaped element 20. Although the gradient index rod lens unit 10 need not be in contact with the channel-formed plate-shaped element 20, if it is in contact with the latter, the focal distance of the gradient index rod lens unit 10 can be adjusted by varying the thickness of the upper glass substrate 201. If the thickness of the upper glass substrate 201 is insufficient, a spacer may be inserted between the gradient index rod lens unit 10 and the upper glass substrate 201. In these cases, the adjustment of the focal distance is also unnecessary, enabling the microchemical system to be designed more compact in size.

The reason why the optical fiber 101 is used for guiding the exciting light and the detecting light is that, whether the gradient index rod lens 12 is disposed in close contact with the tip of the optical fiber 101 or in spaced relation thereto, it is unnecessary to adjust the optical paths of the exciting light and the detecting light and the optical axis of the gradient index rod lens unit 10 for each measurement, thereby enhancing the working efficiency of the user. Moreover, no jig and solid surface table are required to align the optical axis. As a result, the microchemical system can be designed compact in size.

The reason why the optical fiber 101 is of the single mode type having only one transmission mode is that in the case where a very small amount of solute in a sample is detected using the photothermal conversion spectroscopic analysis method, it is desirable that the exciting light should be as small as possible to obtain a great amount of energy used for the photothermal conversion, and a thermal lens having a small aberration should be generated by the exciting light. The exciting light used to generate the thermal lens should desirably have a Gaussian distribution. Since light output from an optical fiber of the single mode type always has a Gaussian distribution, such an optical fiber is suitable for making the focal point of the exciting light small. If the thermal lens generated by the exciting light is small in size, it is desirable that the detecting light should also be limited to as small in diameter as possible to increase the number of detecting light beams passing the thermal lens to the maximum possible number. To this end, it is preferable to use an optical fiber in which the exciting light and the detecting light are transmitted in the single mode.

Next, examples of the gradient index rod lenses will be described with reference to FIGS. 2 and 3.

Figure 2:
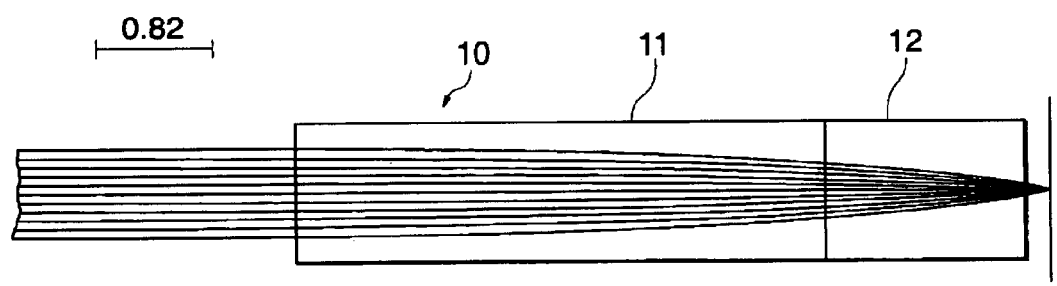
FIG. 2 is a view useful in explaining a gradient index rod lens unit 10 comprised of a combination of gradient index rod lenses 11 and 12 having the same diameter, appearing in FIG. 1.

FIG. 2 is a view useful in explaining a gradient index rod lens unit 10 comprised of a combination of gradient index rod lenses 11 and 12 having the same diameter, appearing in FIG. 1.

In FIG. 2, the gradient index rod lenses 11 and 12 having the same diameter are bonded together with their axes in alignment. The gradient index rod lenses 11 and 12 are equilvalent to a thallium-based SLW lens and a lithium-based SLA12 lens described in a catalogue of SELFOC (registered trademark) issued by Nippon Sheet Glass Co., Ltd. The inlet-side gradient index rod lens 11 is equivalent to the lithium-based SLA12 lens, and the outlet-side gradient index rod lens 12 is equivalent to the thallium-based SLW lens. The gradient index rod lenses 11 and 12 both have a diameter of 1 mm and an aperture diameter of 0.7 mm.

Properties of a gradient index rod lens unit 10 comprised of a combination of these gradient index rod lenses 11 and 12 are shown in TABLE 1. $n_0$ represents the refractive index at the optical axis, and g represents the square distribution constant. Two types of light having different wavelengths are input. The wavelength of the first light is 532 nm, and the wavelength of the second light is 633 nm. The both types of light are input in the form of parallel light to the gradient index rod lens 11. The length of the gradient index rod lens unit 10 is set such that the first light output from the gradient index rod lens 12 forms a focal point in the air at a distance of 0.2 mm from the end face of the gradient index rod lens 12.

TABLE 1

| TYPE | 532 nm | | 633 nm | |
| --- | --- | --- | --- | --- |
|  | $n_0$ | g | $n_0$ | g |
| SLW | 1.6156 | 0.6153 | 1.6071 | 0.6078 |
| SLA12-EQUI. | 1.6172 | 0.2524 | 1.6092 | 0.2523 |

TABLE 2 shows values of a difference ΔL in focal position between the exciting light and the detecting light when the lengths of the gradient index rod lenses 11 and 12 are varied while the distance from the end face of the gradient index rod lens 12 to the focal point (back focus) is maintained constant.

TABLE 2

| SLW LENS LENGTH (mm) | SLA12-EQUI. LENS LENGTH (mm) | ΔL (μm) | NA AT FOCAL POSITION (532 nm) |
| --- | --- | --- | --- |
| 0 | 5.90 | 3.6 | 0.142 |
| 1.20 | 4.21 | 10.0 | 0.206 |
| 1.37 | 3.81 | 21.3 | 0.227 |
| 2.24 | 0 | 28.8 | 0.341 |

It will be learned from TABLE 2 that chromatic aberrations falling within chromatic aberration ranges inherently possessed by the respective gradient index rod lenses can be obtained as desired by adjusting the lengths of the gradient index rod lenses. Thus, a gradient index rod lens unit having an optimum chromatic aberration determined by the dimensions of the channel 204 of the channel-formed plate-shaped element 20, the type of the solvent, the concentration of the solute, the intensity of the exciting light, the frequencies of the exciting light and the detecting light, and the like can be easily manufactured by combining gradient index rod lenses having different chromatic aberrations.

Next, a description will be given of the convergence of light output from an optical fiber for which the NA (lens numerical aperture) is 1.2. It is assumed that the diameter of the gradient index rod lenses 11 and 12 to be used is 1 mm, and the distance between the optical fiber 101 and the gradient index rod lens 1 is 1.0 mm. It is also assumed that the first light passes a glass substrate (made of Pyrex Glsss) of a thickness of 0.18 mm and forms a focal point in water such as in the channel 204 at a depth of 0.05 mm from the water surface. It is further assumed that the same gradient index rod lens unit 10 as in TABLE 1 is used, the light inler-side gradient index rod lens 11 is equivalent to the SLA12 lens, and the light outlet-side gradient index rod lens 12 is equivalent to the SLW lens.

Values of the focal position difference ΔL between the exciting light and the detecting light obtained by varying the lengths of the gradient index rod lenses 11 and 12 while the above conditions are satisfied are shown in TABLE 3. From TABLE 3, it will be learned that even with light output from a point light source such as the optical fiber 101, desired chromatic aberrations falling within the chromatic aberration ranges inherently possessed by the respective gradient index rod lenses 11 and 12 can be obtained by adjusting the lengths of the gradient index rod lenses 11 and 12.

TABLE 3

| SLW LENS LENGTH (mm) | SLA12-EQUI. LENS LENGTH (mm) | ΔL (μm) | NA AT FOCAL POSITION (532 nm) |
| --- | --- | --- | --- |
| 0 | 12.02 | 5 | 0.200 |
| 1.70 | 9.04 | 12 | 0.377 |
| 2.34 | 5.81 | 22 | 0.481 |
| 3.26 | 2.00 | 35 | 0.302 |
| 4.68 | 0 | 47 | 0.199 |

Next, it will be shown that only NA can be varied without the back focus and the chromatic aberration being varied, by varying the diameter of the outlet-side SLW lens.

Figure 3:
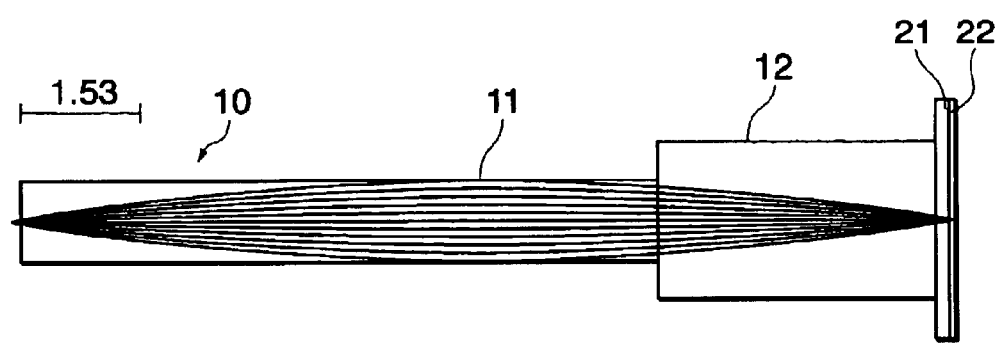
FIG. 3 is a view useful in explaining a lens comprised of a combination of gradient index rod lenses having respective different diameters.

FIG. 3 is a view useful in explaining a lens unit comprised of a combination of gradient index rod lenses having respective different diameters.

As is the case with FIG. 2, it is assumed that the distance between the optical fiber and the gradient index rod lens is 0.1. mm, and that the first-light passes the a glass substrate 21 made of Pyrex Glass of a thickness of 0.18 mm and forms a focal point in water 22 at a depth of 0.05 mm from the water surface.

As shown in TABLE 3, if the length of the inlet-side SLA12-equivalent lens is 5.81 mm and that of the outlet-side SLW lens is 2.34 mm, a chromatic aberration of 22 $\mu$m is obtained, with NA at the focal position being 0.481. In this case, if the diameter of the SLW lens is doubled, i.e. set to 2 mm, the length of the same is set to 3.50 mm, and the length of the SLA12-equivalent lens is set to 8.28 mm, NA at the focal position can be reduced to 0.234 with the chromatic aberration and the back focus remaining unchanged. Thus, it will be understood that the value of chromatic aberration and NA at the focal position can be adjusted without any need of changing other parameters than the length and diameter of the gradient index rod lenses.

Figure 4:
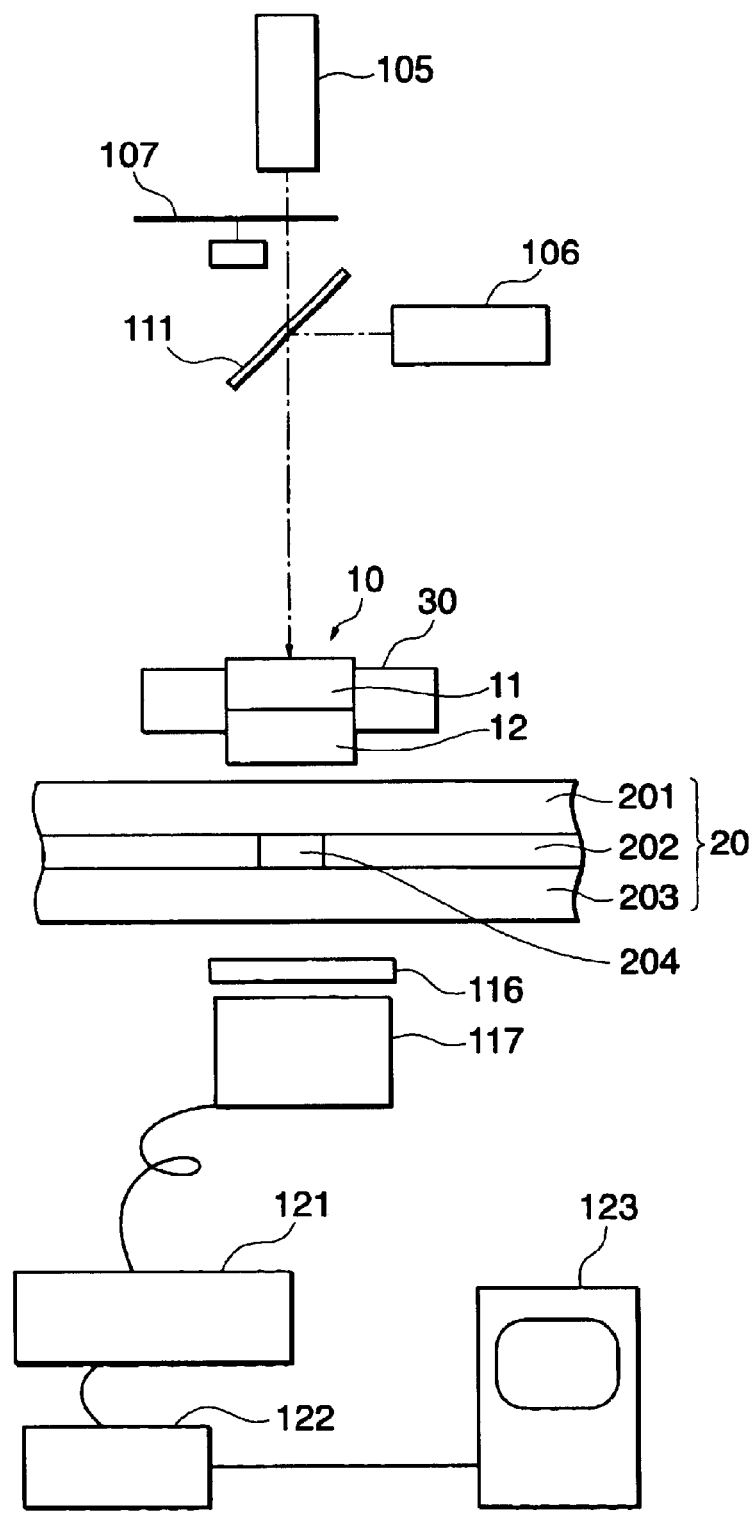
FIG. 4 is a schematic view showing the constitution of a microchemical system with a gradient index rod lens unit according to a second embodiment of the present invention.
Figure 5:
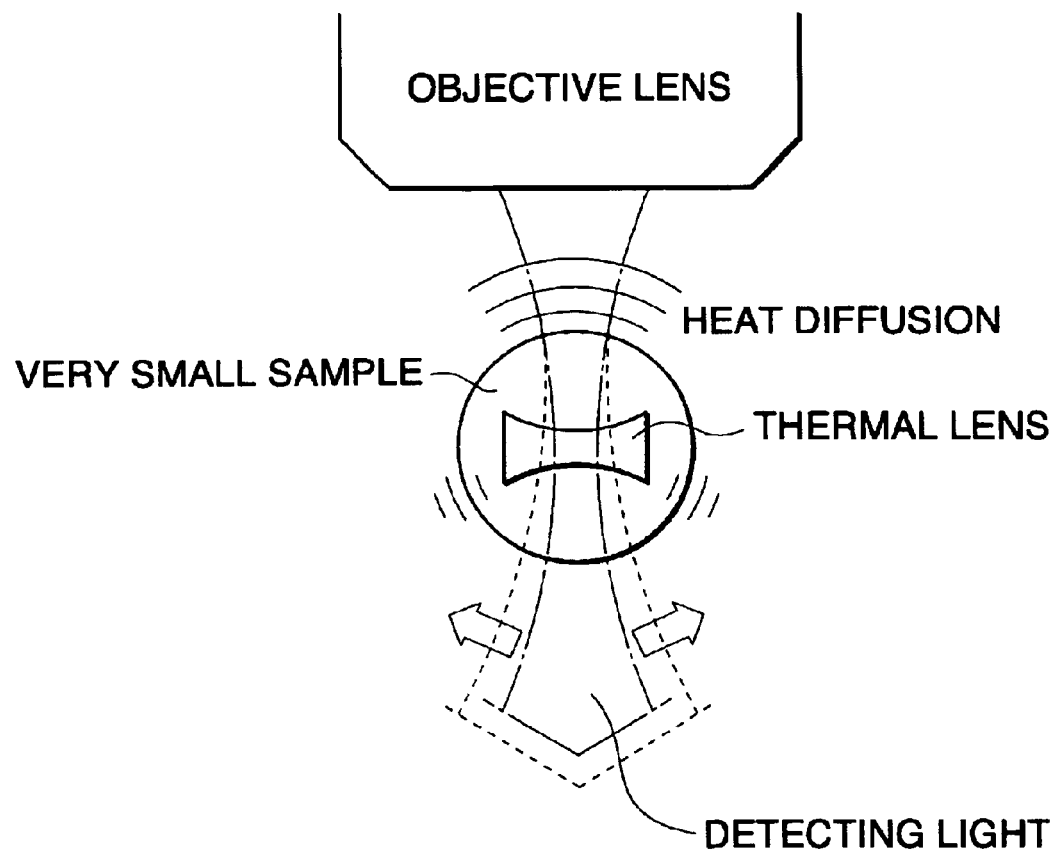
FIG. 5 is a view useful in explaining the principle of a thermal lens.
Figure 6A:
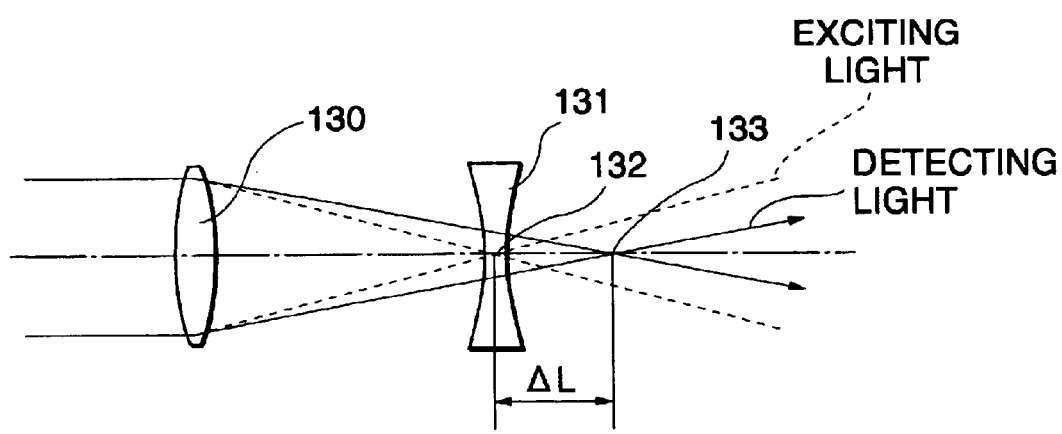
FIG. 6A is a view useful in explaining the formation position of a thermal lens and the focal position of detecting light in the direction of travel of exciting light in the case where an objective lens having chromatic aberration is used.
Figure 6B:
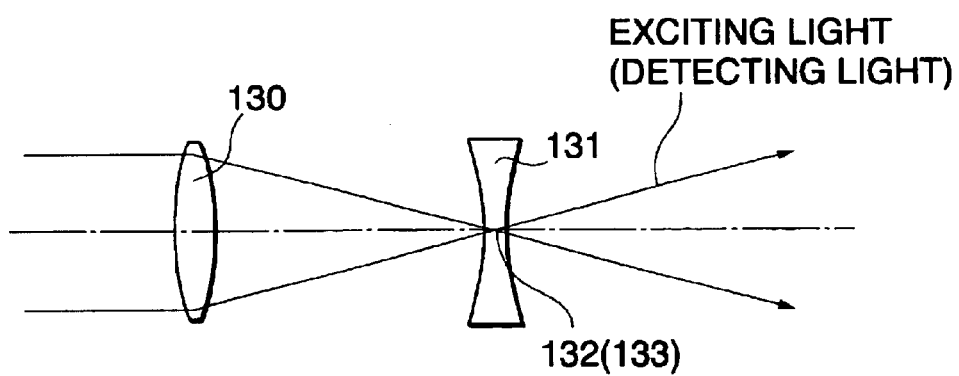
FIG. 6B is a view useful in explaining the formation position of a thermal lens and the focal position of detecting light in the direction of travel of exciting light in the case where an objective lens having no chromatic aberration is used.

FIG. 4 is a schematic view showing the constitution of a microchemical system with a gradient index rod lens unit according to a second embodiment of the present invention. In the figure, component elements corresponding to those in the microchemical system of FIG. 1 are designated by identical reference numerals, description of which is omitted.

In FIG. 4, the microchemical system according to the present embodiment is not provided with the optical fiber for guiding the exciting light and the detecting light, and instead, the exciting light and the detecting light are guided as space light to the gradient index rod lens unit 10. The exciting light output from the exciting light source 105 and the detecting light output from the detecting light source 106 are coaxially aligned with each other by a dichroic mirror 111. The coaxially aligned exciting light and detecting light are directed toward the gradient index rod lens unit 10. At this time, the optical path of the exciting light and the detecting light is aligned with the optical axis of the gradient index rod lens unit 10.

According to the second embodiment of the present invention, the gradient index rod lens unit 10 has an amount of chromatic aberration suitable for the measuring conditions and the object to be measured. As a result, even if the exciting light and the detecting light are guided as space light, high-precision detection is possible. Further, there is no need to provide an optical system for adjusting the focal position of the exciting light or the detecting light outside the lens unit, which can make it possible to design the microchemical system compact in size.

Industrial Applicability

As described above in detail, according to the gradient index rod lens unit of the present invention, at least one of the gradient index rod lenses is different in chromatic aberration from the other gradient index rod lenses. As a result, the chromatic aberration of the gradient index rod lens unit can be made to be a desired chromatic aberration by suitably combining the gradient index rod lenses.

According to the gradient index rod lens unit of the present invention, the at least one of the plurality of gradient index rod lenses is different in diameter from the other gradient index rod lenses. As a result, NA at the focal position can be adjusted while the back focus remains constant, by suitably combining the gradient index rod lenses.

According to the microchemical system of the present invention, the converging lens comprises the gradient index rod lens unit according to the first aspect of the present invention. As a result, the above effects possessed by the gradient index rod lens unit can also be provided, and further the microchemical system can be designed compact in size.

According to the microchemical system of the present invention, the optical fiber guides the exciting light and the detecting light to the gradient index rod lens unit. As a result, it is unnecessary to adjust the optical paths of the exciting light and the detecting light for each measurement, thereby enhancing the working efficiency of the user.

According to the microchemical system of the present invention, the gradient index rod lens unit is mounted on a tip of the optical fiber. As a result, it is unnecessary to align the exciting light and the detecting light with the optical axis of the gradient index rod lens unit for each measurement, thereby enhancing the working efficiency of the user.

According to the microchemical system of the present invention, the optical fiber exhibits a single mode in the frequencies of the exciting light and the detecting light. As a result, a thermal lens generated by the exciting light has a reduced aberration, making it possible to achieve an accurate measurement.

What is claimed is:

1. A gradient index rod lens unit for use in a microchemical system including a converging lens that converges exciting light and detecting light onto a sample, and a measuring device that measures intensity of the detecting light passing through a thermal lens generated in the sample, said gradient index rod lens unit comprising:
   a plurality of cylindrical gradient index rod lenses arranged in series, each of the gradient index rod lenses having a refractive index varying from an optical axis thereof toward a periphery thereof;
   wherein at least one of the plurality of gradient index rod lenses is different in chromatic aberration from the other gradient index rod lenses.

2. A gradient index rod lens unit as claimed in claim 1, wherein the at least one of the plurality of gradient index rod lenses is different in diameter from the other gradient index rod lenses.

3. A gradient index rod lens unit as claimed in claim 1, wherein one of the at least one of the plurality of gradient index rod lenses and the other gradient index rod lenses contains thallium such that the thallium varies in concentration from the optical axis thereof toward the periphery thereof, and the other contains lithium such that the lithium varies in concentration from the optical axis thereof toward the periphery thereof.

4. A microchemical system comprising:
   a converging lens that converges exciting light and detecting light onto a sample; and
   a measuring device that measures intensity of the detecting light passing through a thermal lens generated in the sample;
   wherein the converging lens comprises a gradient index rod lens unit comprising a plurality of cylindrical gradient index rod lenses arranged in series, each of the gradient index rod lenses having a refractive index varying from an optical axis thereof toward a periphery thereof, and wherein at least one of the plurality of gradient index rod lenses is different in chromatic aberration from the other gradient index rod lenses.

5. A microchemical system as claimed in claim 4, wherein the exciting light is different in focal position from the detecting light, and an interval between the focal position of the exciting light and the focal position of the detecting light is greater than a confocal length of the gradient index rod lens unit and less than a value 30 times as large as the confocal length.

6. A microchemical system as claimed in claim 4, further comprising an optical fiber that guides the exciting light and the detecting light to the gradient index rod lens unit.

7. A microchemical system as claimed in claim 6, wherein the gradient index rod lens unit is mounted on a tip of the optical fiber.

8. A microchemical system as claimed in claim 6, wherein the optical fiber exhibits a single mode in frequencies of the exciting light and the detecting light.

9. A gradient index rod lens unit as claimed in claim 2, wherein one of the at least one of the plurality of gradient index rod lenses and the other gradient index rod lenses contains thallium such that the thallium varies in concentration from the optical axis thereof toward the periphery thereof, and the other contains lithium such that the lithium varies in concentration from the optical axis thereof toward the periphery thereof.

10. A microchemical system as claimed in claim 5, further comprising an optical fiber that guides the exciting light and the detecting light to the gradient index rod lens unit.

11. A microchemical system as claimed in claim 10, wherein the gradient index rod lens unit is mounted on a tip of the optical fiber.

12. A microchemical system as claimed in claim 7, wherein the optical fiber exhibits a single mode in frequencies of the exciting light and the detecting light.

* * * * *